SYSTEM FOR TRANSMITTING TO A REMOTE POINT A SIGNAL THAT VARIES AS A FUNCTION OF THE CURRENT FLOW IN A HIGH VOLTAGE CONDUCTOR

Filed Aug. 14, 1963

INVENTOR.
EDMUND O. SCHWEITZER, JR.
BY Robert R. Lockwood
Atty.

3,428,896

SYSTEM FOR TRANSMITTING TO A REMOTE POINT A SIGNAL THAT VARIES AS A FUNCTION OF THE CURRENT FLOW IN A HIGH VOLTAGE CONDUCTOR

Edmund O. Schweitzer, Jr., 1002 Dundee Road, Northbrook, Ill. 60062

Filed Aug. 14, 1963, Ser. No. 302,197
U.S. Cl. 324—126 3 Claims
Int. Cl. G01v *33/00*

ABSTRACT OF THE DISCLOSURE

A radio transmitter is mounted on a high voltage electric power transmission line, is energized by power derived from current flow in the conductor, and is modulated in accordance with the current flow which may be alternating or direct current. For direct current, two transmitters are used, one for each direction of current flow. The transmitter is energized by employing the voltage drop along the conductor with current limiting means therebetween and is modulated by a circuit employing an inductor with a saturable magnetic core.

This invention relates, generally, to current measuring systems for either alternating or direct current electric power systems operating at voltages ranging upwardly to 750 kv. It constitutes an improvement over the systems disclosed in my U.S. Patent No. 2,724,821, issued Nov. 22, 1955, and in my Patents 3,197,702, issued July 27, 1965; 3,223,889, issued Dec. 14, 1965; and 3,275,892, issued Sept. 27, 1966.

Among the objects of this invention are: To provide for reducing the effects of corona in the housing of a radio transmitter that operates at the potential of a conductor of a high voltage electric power transmission line; to construct the housing of metal of such configuration that is provides a minimum of sharp edges likely to promote corona discharge; to employ for this purpose a spheroidical metallic member having all or substantially all of its external surface of arcuate configuration; to insulate the metallic housing from the conductor and employ it as the antenna for the radio transmitter; to energize the radio transmitter as the result of current flow through the conductor and to modulate it as a function of the magnitude of the current flow; to limit the voltage applied for energizing the radio transmitter to a predetermined value regardless of the magnitude of the current flow in circuit; to provide two radio transmitters that operate at the potential of a conductor of a high voltage electric power transmission line in which direct current may flow in either direction with one radio transmitter being energized only in response to current flow in one direction and the other radio transmitter being energized only in response to current flow in the opposite direction; to employ at a location remote from the transmitter receiving means individual to the two radio transmitters and arranged and adapted to be responsive only to the radio transmitter that is energized; and to provide for energizing a radio transmitter that operates at the potential of a conductor of a high voltage electric power transmission line and for modulating it in response to flow of direct current in either direction or to flow of alternating current in the conductor.

Figure 1:
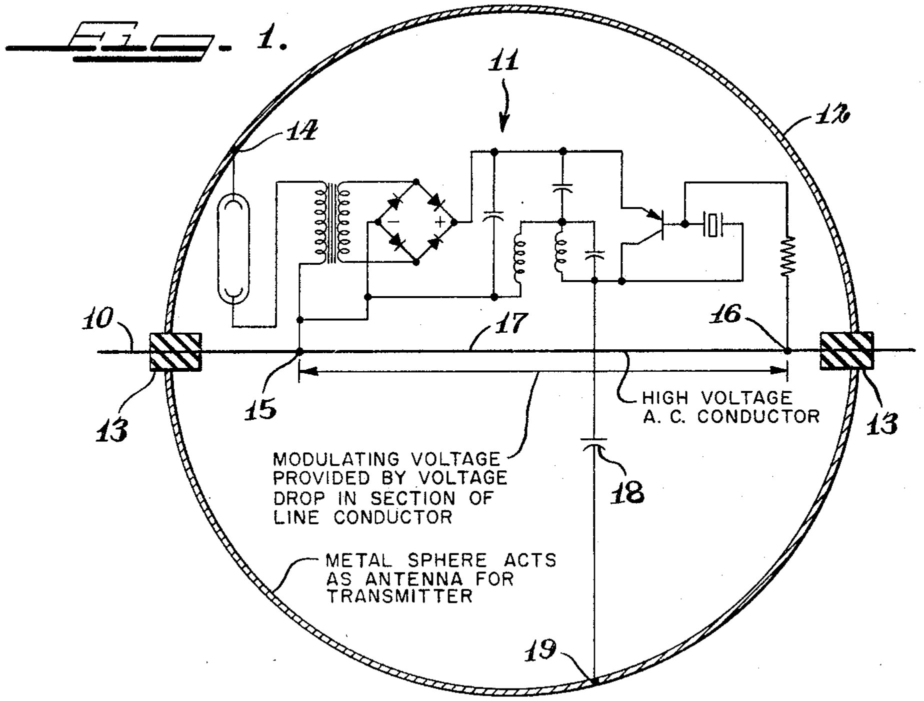
FIG. 1 illustrates how a metal sphere can be mounted on a high voltage alternating current conductor for housing a radio transmitter.

Referring now particularly to FIG. 1 of the drawings, it will be observed that the reference character 10 designates a conductor which may comprise one phase of a three phase high voltage alternating current transmission line. Associated with the conductor 10 is a radio transmitter that is indicated, generally, at 11 and is suitably mounted in a housing 12 that preferably is in the form of a metal sphere. Insulators 13—13 serve to mount the housing 12 on the conductor 10 but in insulated relation thereto.

In order to energize the radio transmitter 11 for the generation of a carrier frequency it is connected at 14 to the housing 12 and to the conductor 10 at 15. As described in my Patent 3,223,889, the radio transmitter 11, when connected in this manner, is energized as long as the conductor 10 is energized and regardless of whether or not current flows in the conductor 10. For modulating the radio transmitter 11 in accordance with the current flow in the conductor 10, it is connected thereto between the point 15 and a point 16 spaced therefrom which provides a resistive section 17. The voltage drop across the resistive section 17 is applied to the radio transmitter 11 for modulating the carrier generated thereby as a function of the magnitude of the alternating current flowing in the conductor 10. For example, if the system is operating at a frequency of 60 cycles per second, the carrier frequency generated by the radio transmitter 11 is modulated at the 60 cycle frequency with the magnitude varying with the magnitude of the current flow in the conductor 10 and particularly through the resistive section 17.

The radio transmitter 11 is connected through a capacitor 18 to the metallic housing 12 at 19. The purpose of this arrangement is to utilize the spherical housing 12 as the antenna for the radio transmitter 11.

While the housing 12 is illustrated in FIG. 1 and described as having a spherical configuration, it will be understood that other configurations can be employed. Preferably the configuration used is one that has a minimum of sharp edges which would be likely to promote corona discharge. The metallic housing that is employed should have all or substantially all of its external surface of arcuate configuration in order to minimize the possibility of corona discharge particularly when the housing is associated with a conductor, such as the conductor 10, energized at a high voltage of the order of 750 kv.

Figure 2:
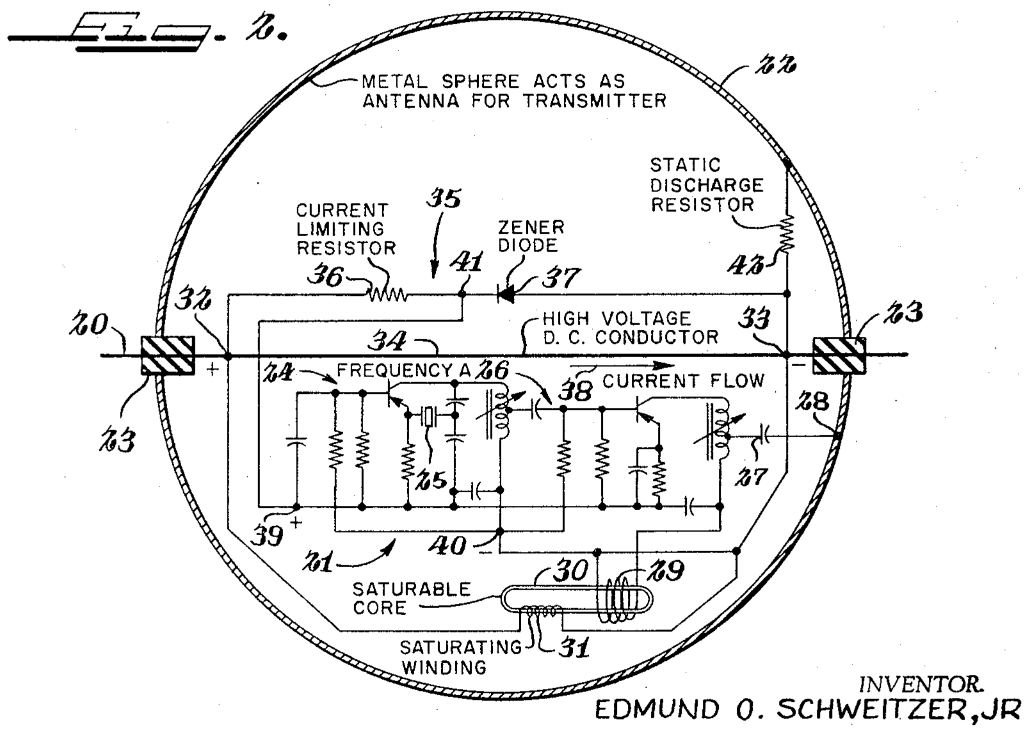
FIG. 2 shows the metal sphere housing a radio transmitter that is associated with a high voltage conductor in which direct current flow in one direction.

Referring now particularly to FIG. 2 of the drawings, it will be observed that the reference character 20 designates a conductor which forms a part of a direct current power transmission system and is energized at a relatively high direct voltage, for example at a voltage of the order of 500 to 750 kv. Since it is desirable to transmit to a remote point an indication of the magnitude of the flow of direct current in the conductor 20, there is associated therewith a radio transmitter that is indicated, generally, at 21. Since the arrangement, construction and mode of operation of the radio transmitter 21 are set forth in detail in my Patent 3,275,892, a description thereof will not be repeated here.

The radio transmitter 21 is enclosed in a housing 22 that may be a metal sphere which has this shape for the reasons outlined hereinbefore. Insulators 23–23 serve to insulate the housing 22 from the conductor 20 and permit it to function as the antenna for the radio transmitter 21.

The radio transmitter 21 includes a crystal oscillator as indicated, generally, at 24. The carrier frequency, indicated as frequency A, is controlled in known manner by a crystal 25. The output of the crystal oscillator 24 is implified by a carrier frequency modulating amplifier that is indicated, generally, at 26 and it is connected by a capacitor 27 to the metal housing 22 at 28 for the purpose of employing it, as indicated, as the antenna.

Associated with the amplifier 26 is a frequency modulation circuit that includes a modulating inductor 29 which has associated therewith a saturable magnetic core 30. A saturating winding 31 surrounds a portion of the magnetic core 30 and is connected for energization between points 32 and 33 along the conductor 20 between which there is a resistive section 34. It will be understood that the voltage drop between the points 32 and 33 varies as a function of the flow of direct current through the resistive section 34 and that there is a corresponding variation in the current flowing through the saturating winding 31. There is a corresponding change in the saturation of the magnetic core 30 which results in a corresponding change in the inductance of the modulating inductor 29. This change in the inductance of the conductor 29 which forms a part of a series resonant circuit including a portion of the capacitance of the amplifier 26, is a function of the magnitude of the current flow in the resistive section 34 or in the conductor 20. The modulating frequency applied to the carrier generated by the crystal oscillator 24 is correspondingly varried and, at a remote point, the variable modulating frequency can be received and employed for indicating or circuit control purposes as may be desired.

The radio transmitter 21 is energized from current limiting means, indicated generally at 35, that is connected for energization across the resistive section 34. The current limiting means 35 includes a limiting resistor 36 and a Zener diode 37. Since it is assumed that direct current flows in the resistive section 34 in the direction indicated by arrow 38, point 32 is at a positive potential with respect to the negative potential at point 33. Accordingly, a positive potential is applied to terminal 39 of the radio transmitter 21 and a negative potential is applied to the terminal 40. The terminal 39 is connected to the common connection at 41 between the current limiting resistor 36 and the Zener diode 37. With this arrangement of the current limiting means 35, it is not possible to apply an over voltage for energizing the radio transmitter 21, even though the current flow through the resistive section 34 is relatively high as is the case under fault or short circuit conditions.

In order to prevent the build up of a static charge on the metallic housing 22, a static discharge resistor 42 is connected therebetween. It will be understood that the impedance of the static discharge resistor 42 is relatively high as compared to the impedance of the capacitor 27, so that, while the static discharge resistor 42 prevents the build up of a static charge on the housing 22, it does not interfere with the application of the output of the radio transmitter 21 to housing 22 acting as the antenna.

Figure 3:
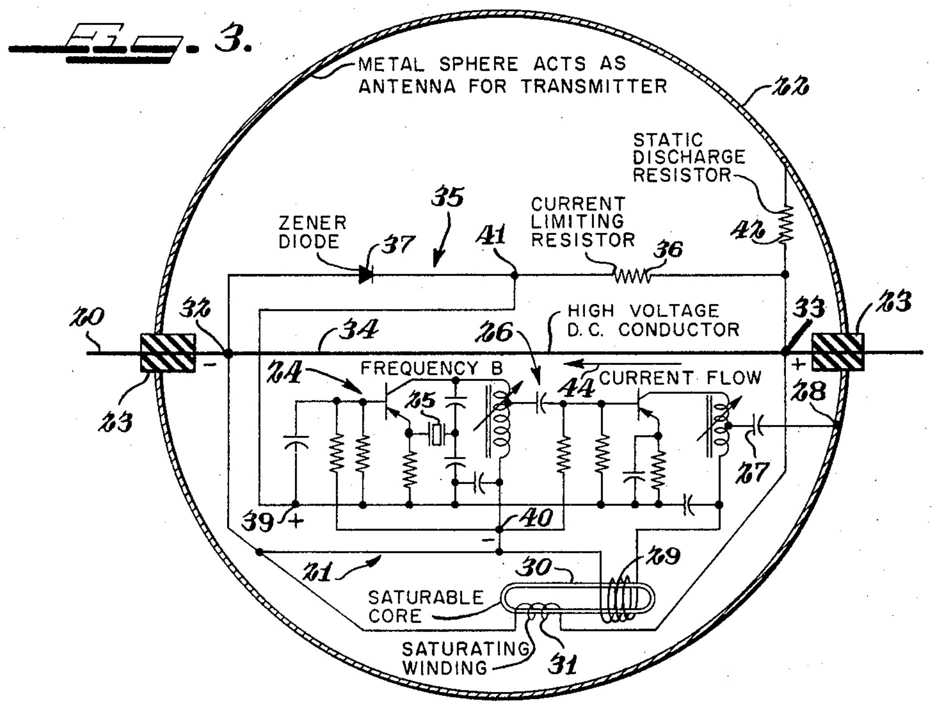
FIG. 3 is a view, similar to FIG. 2, but showing the connections for operating the transmitter when the direct current flows in the opposite direction.

Referring now particularly to FIG. 3 of the drawings, it will be noted that the arrangement is essentially the same as that shown in FIG. 2 and described hereinbefore except that the current flow in the resistive section 34, as indicated by arrow 44, is in a direction that is opposite to the direction of current flow in FIG. 2. Corresponding changes appear in the connections between the current limiting means 35 and the points 32 and 33 at the ends of the resistive section 34. For illustrative purposes it is pointed out that the crystal oscillator 24 shown in FIG. 3 is arranged to generate a carrier frequency B which is different from the frequency A generated by the crystal oscillator 24 and shown in FIG. 2.

Figure 4:
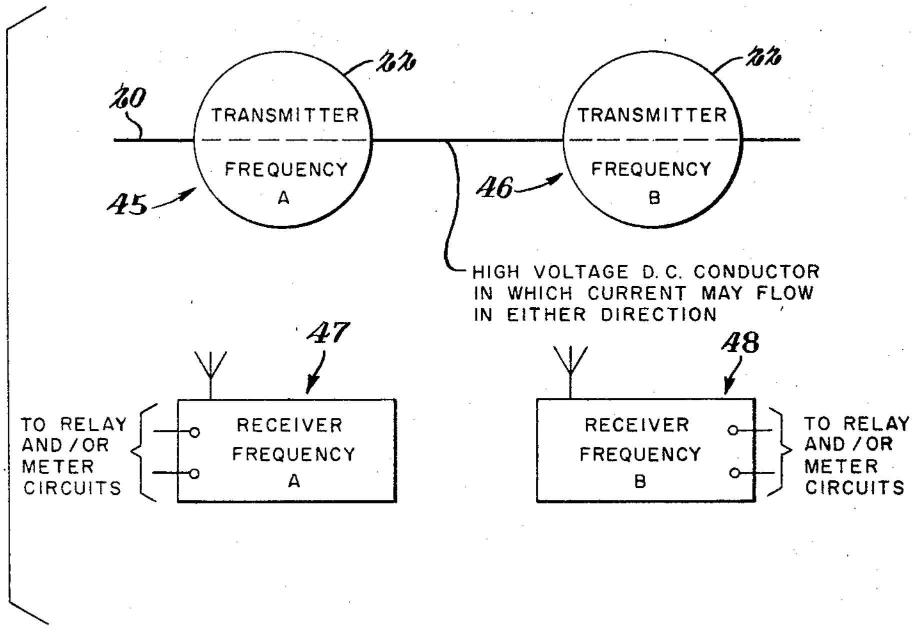
FIG. 4 illustrates, diagrammatically, how the transmitters shown in FIGS. 2 and 3 and operating on different frequencies can be employed for transmitting to receivers correspondingly tuned to indicate at a remote point the magnitude and direction of flow of direct current in the conductor.

FIG. 4 shows how two radio transmitters, shown generally at 45 and 46, and associated with the conductor 20 can be employed for indicating at a remote point the direction in which direct current flows in the conductor 20. As shown here transmitter 45 is arranged to operate at frequency A while the transmitter 46 is arranged to operate at frequency B with these frequencies being spaced apart sufficiently far so that receivers 47 and 48 are responsive individually thereto. It will be understood that the receivers 47 and 48 can be identical in construction with means being provided for making them selective to the frequencies A and B. They can be crystal controlled with provision being made for control by crystals that correspond to the frequencies A and B to be received.

As illustrated in FIG. 4 the receivers 47 and 48 can be connected to relay and/or meter circuits as may be desired.

Figure 5:
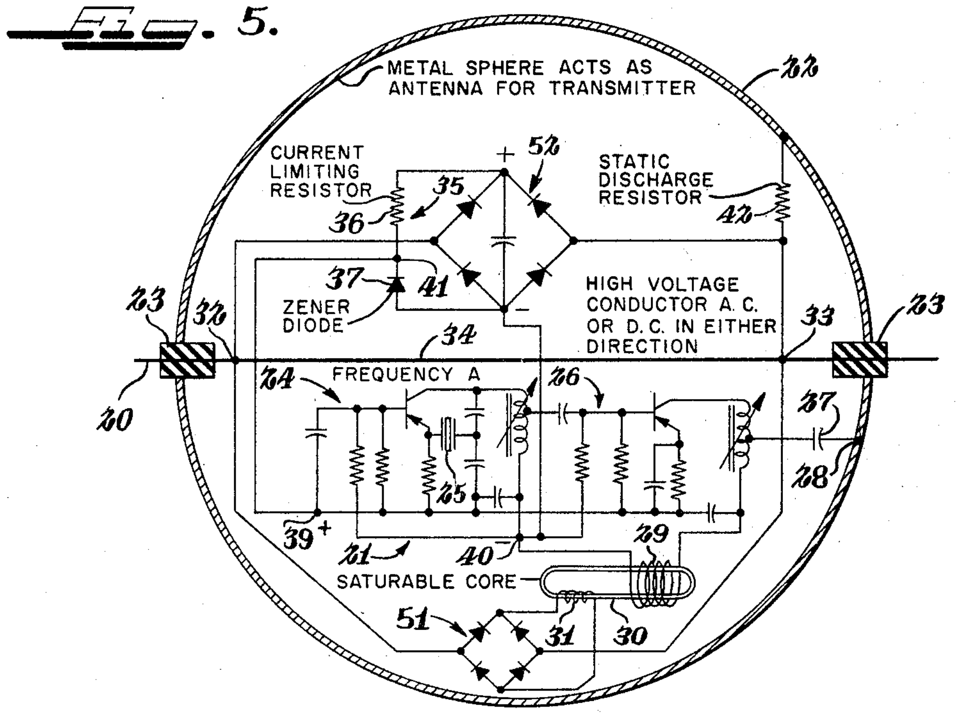
FIG. 5 shows how provision can be made for transmitting a signal to a remote point from a high voltage conductor in which either alternating current or direct current in either direction flows.

FIG. 5 shows a system that is similar to the systems shown in FIGS. 2 and 3 and arranged for use with the conductor 20 in which direct current may flow in either direction or in which alternating current may flow. In order to accommodate these several conditions, the full wave rectifier, indicated generally at 51 is connected for energization across points 32 and 33 at the ends of the resistive section 34. Thus, regardless of whether alternating or direct current flows in the conductor 20, the saturating winding 31 is energized with direct current to control the saturation of the saturable magnetic core 30.

Another full wave rectifier, shown generally at 52, is connected between the points 32 and 33 at the ends of the resistive section 34. The output terminals of the full wave rectifier 52 are connected across the terminals of the current limiting means 35 with the connections to the radio transmitter 21 being otherwise as described hereinbefore.

Figures 6, 7:
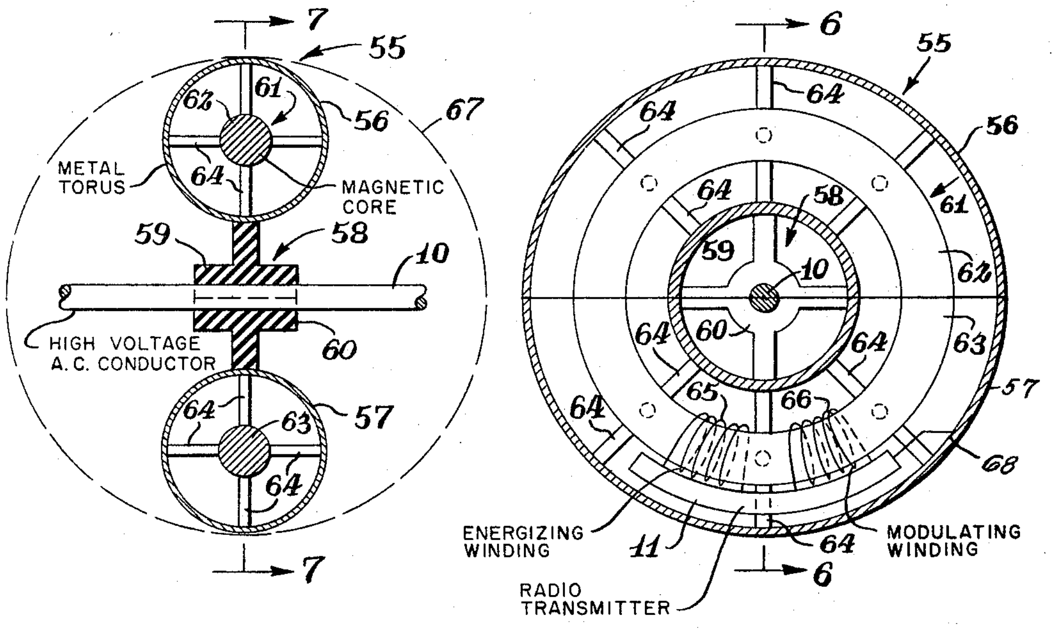
FIG. 6 is a vertical sectional view taken generally along the line 6—6 of FIG. 7 and shows how the radio transmitter can be housed in a metal torus that surrounds the high voltage conductor in which alternating current flows.
FIG. 7 is a vertical sectional view taken generally along the line 7—7 of FIG. 6.

FIGS. 6 and 7 of the drawings illustrate how a metal torus, shown generally at 55, can be employed for housing a radio transmitter, such as the radio transmitter 11 illustrated in FIG. 1. However, the connections for energizing and modulating the transmitter 11 are somewhat different.

The metal torus 55 surrounds the conductor 10 and, in order to facilitate assembly, it is formed in an upper section 56 and a lower section 57. An insulating spider, shown generally at 58, serves to mount the upper and lower sections 56 and 57 on the conductor 10. The insulating spider 58 is formed in two sections, i.e., an upper section 59 and a lower section 60, to facilitate application to the conductor 10.

Within the metal torus 55 there is positioned an annular magnetic core that is indicated, generally, at 61. It is formed with an upper section 62 and a lower section 63 to correspond to the upper and lower sections 56 and 57 of the metal torus 55. Radial support spokes 64 function to hold the annular magnetic core 61 in position.

It will be understood that alternating magnetic flux is induced in the annular magnetic core 61 on flow of alternating current in the conductor 10. In order to energize and modulate the radio transmitter 11 an energizing winding 65 and a modulating winding 66 are positioned on the magnetic core 61. They are arranged in the manner described in my Patent 3,223,889 to energize the radio transmitter 11 and to modulate the carrier frequency generated thereby for the purpose of providing at a remote point a signal which corresponds to the magnitude of the flow of alternating current in the conductor 10.

Attention is called to the similarity in configuration of the spherical housing 12 or 22 and the metal torus 55. The broken line outline 67 shows the relationship and the outer surface of the metal torus 55, in effect, is a part of a spheroidical surface.

As shown in FIG. 7 the radio transmitter 11 is connected at 68 to the metal torus 55 in order to utilize it as the antenna.

What is claimed as new is:

1. In combination with a conductor of a high voltage electric power transmission line in which direct current flows in one direction or the other first and second radio transmitters mounted on and energized at the potential of said conductor, circuit means interconnecting said conductor and each transmitter for energizing it by current flow resulting from the voltage drop along said conductor as a result of flow of direct current through said conductor, circuit means interconnecting said conductor and said first radio transmitter to cause it to transmit a signal corresponding to the magnitude of the flow of said direct current in one direction, and circuit means interconnecting said conductor and said second radio transmitter to cause it to transmit a signal corresponding to the magnitude of the flow of said direct current in the opposite direction.

2. In combination with a current carrying conductor of a high voltage electric power transmission line a radio transmitter mounted on and energized at the potential of said conductor, means for energizing said radio transmitter including full wave rectifying means having its input terminals connected to said conductor between points therealong between which a voltage drop occurs that is a function of the magnitude of the current flow therein, and current limiting means connected between the output terminals of said rectifying means, said current limiting means including a current limiting resistor connected in series with a diode, the common connection between said current limiting resistor and said diode being connected to energize said transmitter, and means for modulating said transmitter including a modulating circuit for normally continuously applying a modulating frequency to said transmitter, an inductor in said modulating circuit associated with a saturable magnetic core, a saturating winding on said core, and full wave rectifying means having its input terminals connected to said conductor between points therealong between which a voltage drop occurs that is a function of the magnitude of the current flow therein and its output terminals connected to energize said saturating winding.

3. In combination with a direct current carrying conductor of a high voltage electric power transmission line a radio transmitter mounted on and operating at the potential of said conductor, means for energizing said transmitter including circuit means connected to said conductor between points therealong between which a voltage drop occurs that is a function of the magnitude of the current flow therein, and current limiting means connected between said points and including a current limiting resistor connected in series with a diode with the common connection therebetween connected to energize said transmitter, and means for modulating said transmitter including a modulating circuit for normally continuously applying a modulating frequency to said transmitter, an inductor in said modulating circuit associated with a saturable magnetic core, a saturating winding on said core, and circuit means connected to said conductor between points therealong between which a voltage drop occurs that is a function of the magnitude of the current flow therein and connected to energize said saturating winding.

References Cited

UNITED STATES PATENTS

| | | | |
|---|---|---|---|
| 1,723,823 | 10/1929 | West | 324—117 |
| 2,304,535 | 12/1942 | Bush | 324—127 X |
| 2,724,821 | 11/1955 | Schweitzer | 324—127 X |
| 2,800,630 | 7/1957 | Kowalczyk | 324—117 X |
| 2,866,159 | 12/1958 | Derr | 324—117 X |
| 3,071,759 | 1/1963 | Kotas | 332—12 X |
| 3,197,702 | 7/1965 | Schweitzer | 324—127 |
| 3,223,889 | 12/1965 | Schweitzer | 317—14 |
| 3,275,892 | 12/1966 | Schweitzer | 317—60 |
| 3,307,108 | 2/1967 | Induni | 325—119 |
| 2,647,223 | 7/1953 | Check | 317—2 |

FOREIGN PATENTS 640,335 12/1936 Germany.

OTHER REFERENCES

Abandoned application 112,108, May 23, 1961, Induni.

RUDOLPH V. ROLINEC, *Primary Examiner.*

A. E. SMITH, *Assistant Examiner.*

U.S. Cl X.R.

324—117, 127; 325—119; 340—201, 207